(12) United States Patent
Breitweg et al.

(10) Patent No.: US 11,247,584 B2
(45) Date of Patent: Feb. 15, 2022

(54) ADJUSTABLE VEHICLE SEAT

(71) Applicant: Bayerische Motoren Werke Aktiengesellschaft, Munich (DE)

(72) Inventors: Uwe Breitweg, Utting am Ammersee (DE); Matthias Franz, Groebenzell (DE); Ingo Janka, Dachau (DE); Harald Lathwesen, Mauern (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 185 days.

(21) Appl. No.: 16/400,105

(22) Filed: May 1, 2019

(65) Prior Publication Data

US 2019/0255972 A1 Aug. 22, 2019

Related U.S. Application Data

(63) Continuation of application No. PCT/EP2017/078098, filed on Nov. 2, 2017.

(30) Foreign Application Priority Data

Nov. 2, 2016 (DE) ..................... 10 2016 221 507.8

(51) Int. Cl.
 *B60N 2/00* (2006.01)
 *B60N 2/02* (2006.01)
 (Continued)

(52) U.S. Cl.
 CPC ......... *B60N 2/0248* (2013.01); *B60N 2/0244* (2013.01); *B60N 2/0284* (2013.01);
 (Continued)

(58) Field of Classification Search
 CPC ...... B60N 2/0248; B60N 2/99; B60N 2/0284; B60N 2/62; B60N 2/66; B60N 2002/0268; B60N 2002/0288
 See application file for complete search history.

(56) References Cited

U.S. PATENT DOCUMENTS 6,220,667 B1 4/2001 Wagner
6,578,917 B1 * 6/2003 Aubert ..................... B60N 2/02
 297/317

(Continued)

FOREIGN PATENT DOCUMENTS

CN 102271982 A 12/2011
CN 103129425 A 6/2013

(Continued)

OTHER PUBLICATIONS

International Search Report (PCT/ISA/210) issued in PCT Application No. PCT/EP2017/078098 dated Feb. 5, 2018 with English translation (six (6) pages).

(Continued)

*Primary Examiner* — Thomas G Black
*Assistant Examiner* — Brittany Renee Peko
(74) *Attorney, Agent, or Firm* — Crowell & Moring LLP

(57) ABSTRACT

An adjustable vehicle seat includes a seat base having a seat surface and a backrest having a backrest surface. In the seat base and/or in the backrest, sensors are provided that detect forces, pressures and/or movements effected by a person sitting on the vehicle seat and consequently issue a signal. A control device is provided that detects the signals issued by the sensors and actuates actuators provided in the vehicle seat to adjust the seat base and/or backrest, or components thereof, in order to adjust the vehicle seat.

14 Claims, 2 Drawing Sheets

(51) Int. Cl.
*B60N 2/90* (2018.01)
*B60N 2/62* (2006.01)
*B60N 2/66* (2006.01)

(52) U.S. Cl.
CPC .................................. *B60N 2/62* (2013.01); *B60N 2/66* (2013.01); *B60N 2/99* (2018.02); *B60N 2002/026* (2013.01); *B60N 2002/0268* (2013.01); *B60N 2002/0288* (2013.01)

(56) References Cited

U.S. PATENT DOCUMENTS

| | | | |
|---|---|---|---|
| 8,886,413 B2* | 11/2014 | Hozumi | B60N 2/00 701/49 |
| 2010/0276973 A1 | 11/2010 | Zenk et al. | |
| 2011/0178680 A1 | 7/2011 | Kato et al. | |
| 2013/0175837 A1 | 7/2013 | Buehlmeyer et al. | |
| 2018/0029503 A1* | 2/2018 | Dhaini | B60N 2/0244 701/49 |
| 2018/0065642 A1* | 3/2018 | Frye | B60W 40/08 701/1 |
| 2018/0264975 A1* | 9/2018 | Bonk | B60N 2/0248 701/49 |
| 2018/0345889 A1* | 12/2018 | Pinkelman | B60R 16/037 |
| 2019/0193592 A1* | 6/2019 | Tarui | B60N 2/0248 701/49 |

FOREIGN PATENT DOCUMENTS

| | | | | |
|---|---|---|---|---|
| DE | 196 44 376 A1 | 4/1998 | | |
| DE | 198 51 698 A1 | 5/2000 | | |
| DE | 198 53 156 A1 | 5/2000 | | |
| DE | 10 2004 062 084 B3 | 6/2006 | | |
| DE | 10 2007 053 119 A1 | 5/2009 | | |
| DE | 10 2009 036 278 A1 | 2/2011 | | |
| DE | 10 2010 049 152 A1 | 11/2011 | | |
| DE | 102010049152 A1 * | 11/2011 | ............... | B60N 2/90 |
| DE | 10 2013 224 873 A1 | 6/2015 | | |
| DE | 10 2013 226 558 A1 | 6/2015 | | |

OTHER PUBLICATIONS

German-language Written Opinion (PCT/ISA/237) issued in PCT Application No. PCT/EP2017/078098 dated Feb. 5, 2018 (six (6) pages).

German-language Search Report issued in counterpart German Application No. 102016221507.8 dated Jun. 9, 2017 with partial English translation (14 pages).

English-language Translation of Chinese Office Action issued in Chinese Application No. 201780067616.2 dated Nov. 27, 2020 (7 pages).

* cited by examiner

ADJUSTABLE VEHICLE SEAT

CROSS REFERENCE TO RELATED APPLICATIONS

This application is a continuation of PCT International Application No. PCT/EP2017/078098, filed Nov. 2, 2017, which claims priority under 35 U.S.C. § 119 from German Patent Application No. 10 2016 221 507.8, filed Nov. 2, 2016, the entire disclosures of which are herein expressly incorporated by reference.

BACKGROUND AND SUMMARY OF THE INVENTION

The invention concerns an adjustable driver's seat of a vehicle as well as a vehicle with at least one such adjustable vehicle seat.

Vehicle seats are usually adjusted by way of many individual adjustment variables in a series of the adjustment variables. In particular, the adjustment is carried out by electrically adjustable units via seat adjustment switches or by mechanically adjustable units with the use of mechanical release levers. The vehicle passenger requires a lot of time to adjust all of the individual adjustable units. These often have to be corrected, because the individual adjustments affect one another.

An adjustable vehicle seat with massage functionality, which is provided with massage elements, is known from DE 10 2009 036 278 A1. The vehicle seat comprises a number of sensors that can detect weight, movement or pressure as input variables. A detected input variable is compared with predetermined variables and a feedback message is carried out by means of the massage element depending on the deviation. As a result, it is intended to be possible to train predetermined muscle groups of the person seated on the vehicle seat.

It is the object of the present invention to provide an adjustable vehicle seat so that the seat adjustment is simplified.

The adjustable vehicle seat according to an aspect of the invention is provided with a seat base having a seat surface and with a backrest having a backrest surface, wherein sensors are provided in the seat base and/or in the backrest that detect forces, pressures and/or movements exerted by a person seated on the vehicle seat and then output a signal. A control device is provided that detects the signals output by the sensors and actuates actuators provided in the vehicle seat for adjusting the seat base and/or the backrest (or components of the seat base and/or the backrest) in order to adjust the vehicle seat.

This sensor actuation of the seat adjustment makes the seat adjustment intuitive. The adjustment can be carried out in an analog manner and fluidly. The desired change in attitude is immediately carried out in the seat when body impressions occur. The seat adjustment is carried out by body pressure introduced into the seat or force that is applied at the points at which sensors are provided.

In one advantageous embodiment, when detecting an input variable by way of at least one of the sensors in a region of the vehicle seat, this region is adjusted by at least one of the actuators in order to comply with the input variable. This enables an adjustment of the vehicle seat to the current sitting posture of a passenger seated on the vehicle seat.

It is advantageous if the control device analyzes the detected signals output by the sensors and determines therefrom a current load profile of the seat base and/or the backrest. The control device then compares the determined current load profile with at least one standard load profile stored in a memory device. And, the control device then actuates the actuators such that the determined load profile approximates to or equals the standard load profile. This static adjustability enables a particularly effective adjustment of the vehicle seat to the current sitting posture of a passenger seated on the vehicle seat.

For example, the adjustment of the vehicle seat to the current sitting posture described above can be carried out during a longer freeway trip if a person seated on the vehicle seat (occupant), for example the driver, wants to sit more comfortably and expresses this wish by increased contact of certain parts of the body on the seat. Then, after the comparison of the determined load profile with the standard load profiles stored in the memory device, the actuators are actuated such that the determined load profile approximates to or equals the corresponding standard load profile.

It is also advantageous if the control device analyzes the detected signals output by the sensors, and determines therefrom a current load profile of the seat base and/or the backrest. The control device compares the determined current load profile with a load profile stored in a memory device that introduces a defined body movement and determines the closest load profile to the current load profile that introduces a known body movement as the predictive load profile. And, the control device actuates the actuators such that the seat base and/or the backrest or components thereof are adjusted according to the body movement associated with the predictive load profile. This embodiment exploits the fact that certain load profiles form a load pattern that precedes an impending movement, so that the seat adjustment is carried out predictively to a seat setting that is adjusted to an intermediate state or an end state of the predicted body movement.

With this design of the invention, a preemptive and thus rapid seat setting can be carried out.

An embodiment of the invention that is particularly advantageous is characterized in that the control device analyzes the detected signals output by the sensors over a predetermined time period and determines therefrom the time-dependent current load profile dynamics of the seat base and/or the backrest. The control device compares the determined current load profile dynamics with load profile dynamics that are stored in a memory device and that reproduce physiological body movement patterns and determines the load profile dynamics closest to the current load profile dynamics that reproduce a defined physiological body movement pattern as the predictive load profile dynamics. The control device actuates the actuators such that the seat base and/or the backrest or components thereof are adjusted time-dependently according to the body movement patterns associated with the predictive load profile. This dynamic adjustment enables the desired change in attitude to be carried out immediately in the vehicle seat when impressions of the body occur. This type of adjustment of the vehicle seat depicts the human physiological movement pattern. In this case, the adjustment is carried out not in individual movements of individually adjustable seat components, but rather in synchronous adjustment movements of individual seat components according to anatomical and physiological body movement patterns.

A physiological body movement pattern is a succession of movements that an occupant carries out, for example in a vehicle. Physiological body movement patterns are a certain sequence of body movements and are not random, but repeat in a similar and hence in a reproducible manner for similar movement processes. For example, if an occupant in a vehicle, starting from a position on a seat with a viewing direction in the direction of travel, wants to carry out a quarter turn to the right, the physiological body movement pattern always includes support in the region of the contact of the left thigh on the seat base (left side panel of the seat base) and a force application into the right thorax region of the seat. With such a pressure distribution in the seat (current load profile dynamics), the desire of the occupant for a quarter turn of the seat can be concluded. By comparing with stored load profile dynamics reproducing physiological body movement patterns, this desire of the occupant for a quarter turn of the seat is verified and the seat is turned through 90° (lagging, simultaneous or leading). Said rotation of the seat is for example advantageous in an autonomously driving vehicle or when a conventional vehicle is at a standstill, so that the occupant is better able to turn to other occupants in the vehicle.

Turning to other occupants in the vehicle can (alternatively or additionally) be facilitated by folding back the so-called headrest. The headrest is the upper region of the backrest. The headrest can be folded rearwards about a folding axis lying in a horizontal plane through the backrest, for example at about half the height of the backrest.

Movement patterns arising as a result of the action of external forces on the occupants, for example acceleration, deceleration, turning, are to be distinguished from the physiological body movement patterns. Said states can be positively sensed and do not trigger any seat adjustment. For example, if an occupant supports himself more with his left thigh on the left side panel of the seat when traversing a right turn, but in contrast to the example above of the introduction of a quarter turn of the seat there is no introduction of force into the right thorax region.

Parameters from the driving mode of the vehicle can be used by the control device for introducing or for suppressing a seat adjustment. In the preceding example of turning, a lateral acceleration signal can be taken into account by the control device.

The sensors, the signals of which form the input variables for the control device, are preferably disposed on the seat. Of course however, at least one sensor can also be disposed on a component of the vehicle that is different from the seat. For example, sensors on the floor of the vehicle can detect whether an occupant is supporting himself on the floor of the vehicle in order to initiate a quarter turn of his seat, for example. The signal of a sensor in the region of the contact area of the left foot of the occupant can thus be used as an input variable for the control device in order to initiate a quarter turn of the seat to the right in the presence of other sensor signals.

It is advantageous here if the adjustment of the seat base and/or the backrest or of components thereof is carried out in synchronism with the physiological body movement patterns associated with the predictive load profile dynamics.

Alternatively, the adjustment of the seat base and/or the backrest or of components thereof can be carried out so as to lead or lag the physiological body movement pattern associated with the predictive load profile dynamics.

An advantageous embodiment of the invention that is especially provided for the driver's seat of the vehicle is characterized in that a first group of actuators can only be actuated by the control device when the (non-autonomously drivable) vehicle is at a standstill and that a second group of actuators can be actuated by the control device while travelling and when the vehicle is at a standstill. The first group includes the so-called anthropometric settings of the vehicle seat, which define the sitting position of the passenger in relation to the seating environment in the vehicle and which ensure for the driver that the vehicle can be controlled safely. The second group includes the so-called comfort settings, which can also be safely changed while travelling. In the case of an autonomous driving mode, in which the driver is not necessary, anthropometric adjustments can also be carried out while travelling.

It is advantageous here if the second group of actuators comprises those actuators that effect the adjustment of at least one of the following vehicle seat components or vehicle seat settings: the side panel of the seat base, the side panel of the backrest, the width of the seat surface, the width of the backrest surface, the length of the seat surface, the thigh support and the lumbar support.

With a further preferred embodiment of the vehicle seat according to the invention, with which actuators for adjusting components of the seat base and/or the backrest are actuated, the control device causes the seat base and/or the backrest to be asymmetrically displaced in relation to a central longitudinal plane of the seat by a corresponding load on the sensors. Thus for example, a correspondingly suitable load pattern can cause a backrest that can be rotated about a vertical axis of the backrest as a whole or rotated in itself to be rotated or twisted by means of the actuated actuators in order to enable the person seated on the vehicle seat to reach the safety belt more comfortably when strapping the belt on, as described for example in DE 10 2013 224 873 A1 in connection with active operation by the user, i.e. by pressing the backrest back on one side.

Finally, the invention is also aimed at a vehicle with at least one of the aforementioned vehicle seats.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
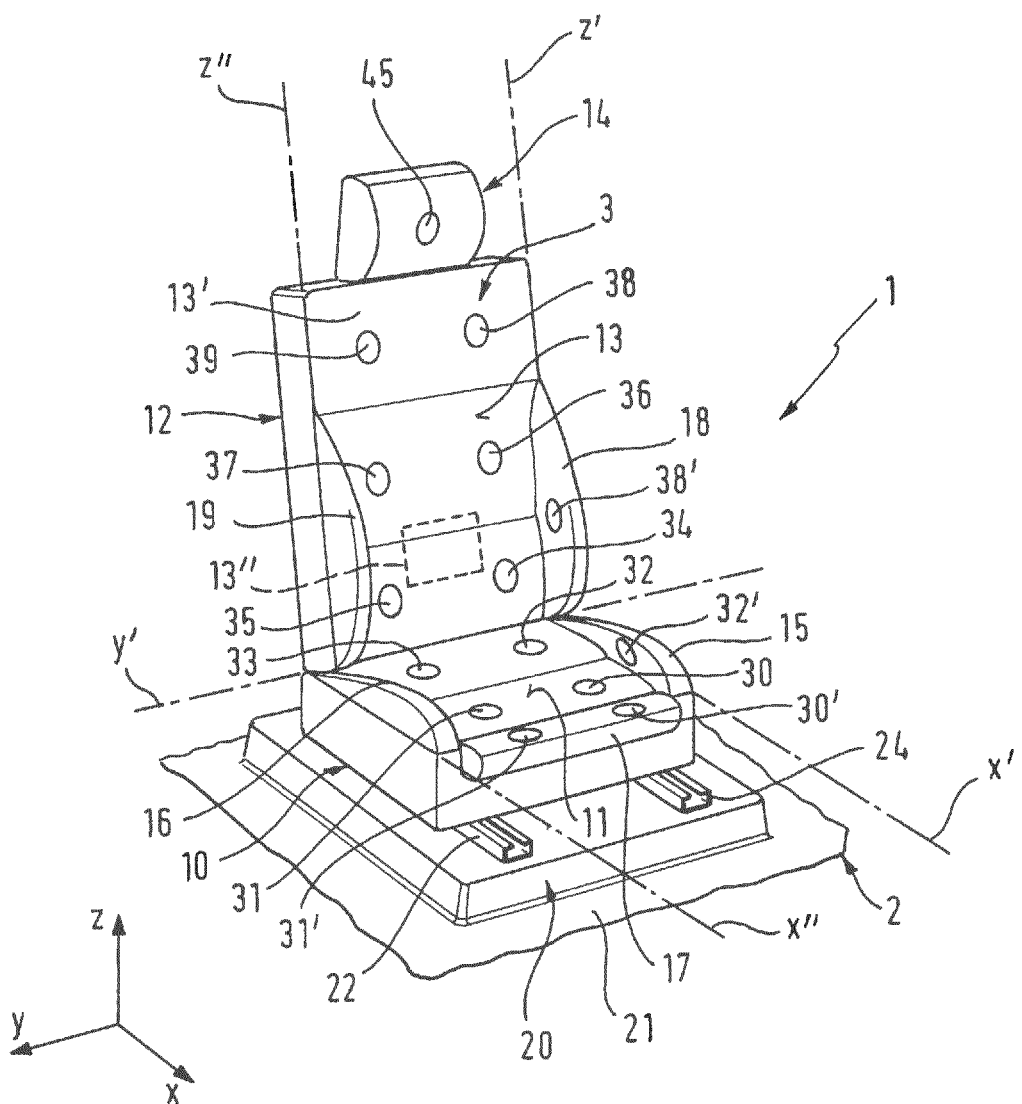
FIG. 1 is a perspective view of a vehicle seat according to an embodiment of the invention.

FIG. 1 shows in a perspective representation a vehicle seat 1, which is disposed in rails 22, 24 on a seat console 20 so as to be longitudinally movable, wherein the seat console 20 is disposed on the floor 21 of the interior of a vehicle 2.

The vehicle seat 1 includes a seat base 10 having a seat surface 11, a backrest 12 having a backrest surface 13 and a head support 14. The inclination of the backrest 12 in relation to the seat base 10 is adjustable in the usual way about a backrest tilt axis y' that lies parallel to the lateral axis y of the vehicle. The head support is also movable in a generally known way in the direction of the vertical axis z of the vehicle and is preferably also adjustable in the direction of the longitudinal axis x of the vehicle.

The seat base 10 is laterally bounded on the top thereof by a left side panel 15 and a right side panel 16, which can be pivoted in the inclination thereof to the seat surface 11 about a pivot axis x' or x'' that is parallel to or inclined with respect to the longitudinal axis x of the vehicle. Furthermore, the seat base 10 is provided on the leading end of the seat surface 11 in the direction of travel with a thigh support 17 that is adjustable in the longitudinal direction of the vehicle.

The adjustabilities described above of the individual components of the seat base 10 are carried out for example by use of actuators that are not shown in FIG. 1, such as are already also used for electrical seat adjustment in conventional vehicle seats.

The backrest 12 is provided with backrest panels laterally bounding the backrest surface 13 and provided beneath the shoulder region 13' of the backrest surface 13, i.e. a left backrest panel 18 and a right backrest panel 19. The backrest panels 18, 19 are also pivotable about a respective pivot axis z', z" that is oriented parallel to the longitudinal extent of the backrest panel, so that by means of said pivotability the width of the backrest is adjustable, primarily in the lumbar region of a person seated on the vehicle seat.

Instead of the pivotability of the side panels 15, 16 of the seat base 10 and/or the side panels of the backrest 18, 19, these can also be moved transversally in the lateral direction of the vehicle (y-direction) or they can be made to be inflated by pneumatic cushions. Said pneumatic inflatability can also be provided in addition to a pivotability or a transversal adjustability of the corresponding side panels 15, 16 or backrest panels 18, 19.

The backrest 12 is furthermore provided with an electro-mechanically or pneumatically adjustable lumbar support 13", which is only schematically represented in FIG. 1 and which is already known in vehicle seats.

A number of sensors 30, 30', 31, 31', 32, 32', 33, 33', 34, 35, 36, 37, 38, 38', 39, 39' that form a sensor arrangement 3 of the vehicle seat 1 are provided both in the seat base 10 and in the backrest 12. The number and arrangement of the sensors shown is only represented by way of example in FIG. 1; fewer or more sensors can definitely be provided, and the sensors can also be disposed at other points of the backrest 12 or the seat base 10, the head support 14 and the other seat components. Of course, the side panels 15, 16 and the backrest panels 18, 19 can also be provided with corresponding sensors 32', 38' and 33', 39' (not represented in FIG. 1). The head support 14 as well as the thigh support 17 can also be provided with sensors 45 or 30', 31', respectively.

Figure 2:
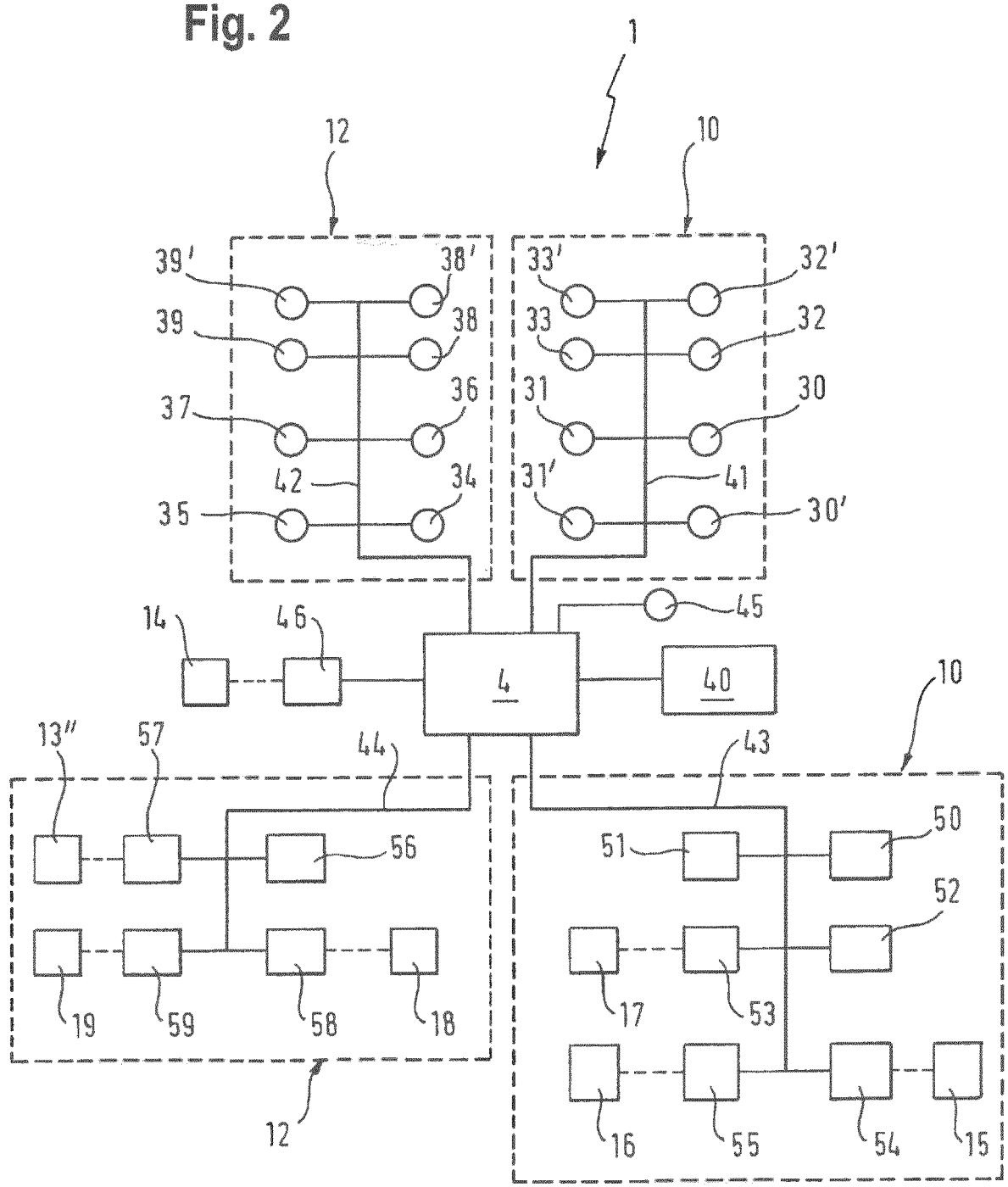
FIG. 2 is a schematic representation of sensors and actuators of the vehicle seat from FIG. 1.

FIG. 2 shows a schematic representation of the sensors and actuators provided in the vehicle seat 1 and the connection thereof to a control device.

The seat surface sensors 30, 31, 32 and 33 provided in the seat base and already described are, for example, electrically conductively connected for data transmission via a first data bus 41 to a control device 4 that is integrated in the vehicle seat 1 or disposed outside thereof. Likewise, by way of said first data bus 41 the control device 4 is connected to two sensors 30', 31' provided in the thigh support 17 and to two sensors 32' or 33' provided in the left side panel 15 or the right side panel 16.

In the same way, the control device 4 is electrically conductively connected for data transmission via a second data bus 42 to the backrest surface sensors 34, 35, 36, 37, 38 and 39 provided in the backrest 12 and to a sensor 38' or 39' provided in the left side panel 18 or in the right side panel 19. The head support 14 also has at least one sensor 45 that is also electrically conductively connected to the control device 4 for data transmission.

The aforementioned sensors provide signals based on forces, pressures and/or movements that are exerted on the seat surface 11 or the backrest surface 13 and/or the side panel 15, 16, the backrest panels 18, 19 and/or the head support 14 by a person seated on the vehicle seat 1. The control device 4 receives these signals and forms therefrom static load profiles and/or dynamic load profiles (load profile dynamics) and compares said load profiles or load profile dynamics with predetermined load profiles or load profile dynamics stored in a memory device 40 connected to the control device 4. Based on this comparison, a decision about an adjustment of the vehicle seat 1 to be conducted is then made by a computer provided in the control device 4. This decision results in the issuing of a number of control commands to actuators provided in the vehicle seat 1.

For applying the adjustment, the control device 4 is electrically connected for signal transmission via a third data bus 43 to an actuator 50 for the longitudinal displaceability of the seat base 10 and hence of the vehicle seat 1, to an actuator 51 for height adjustment of the seat base 10, to an actuator 52 for inclination adjustment of the seat base 10, to an actuator 53 for longitudinal adjustment of the thigh support 17, to an actuator 54 for adjusting the left side panel 15 and to an actuator 55 for adjusting the right side panel 16 of the seat base 10.

Moreover, the control device 4 is connected for electrical signal transmission via a fourth data bus 44 to an actuator 56 for inclination adjustment of the backrest 12, to an actuator 57 for adjusting the lumbar support 13", to an actuator 58 for adjusting the left backrest panel and to an actuator 59 for adjusting the right backrest panel. Finally, the control device 4 is connected to a further actuator 46 for adjusting the head support 14.

Where "actuator" was mentioned above, this term is not to be understood to mean a respective individual actuator, but a number of actuators can also be provided for the respective adjustability. The actuators are preferably electromechanical actuators, for example servomotors, but electropneumatic or electrohydraulic actuators can also be provided. Also, it is obvious to the person skilled in the art that the present invention is not limited to the actuators shown in the figures and described in the description of the figures, but that other actuators and corresponding sensors for other than the mentioned adjustment tasks can be provided in the vehicle seat according to the invention.

Although, as described in the introduction to the description, the actuation of the respective actuators can be carried out based on a static load profile in order to adjust the vehicle seat 1 to a current body posture of the person seated on the vehicle seat 1 and to readjust the seat surface, the backrest surface and/or the other seat components in the event of a change of the body posture, it is particularly preferred to carry out the seat adjustment based on sensor signals detected in the vehicle seat, in that a predictive static load profile or predictive load profile dynamics is/are determined from a current body posture or a current body movement of the person seated on the vehicle seat 1 and to adjust the vehicle seat correspondingly to the previously calculated body position. In other words, a desire to move or a desire to reposition by the person seated on the vehicle seat 1 is predicted by the analysis of the signals provided by the sensors installed in the vehicle seat, and the vehicle seat is then adjusted to the body posture or body position that corresponds to the result of said desire.

If for example the person seated on the vehicle seat 1 moves from a relaxed sitting position that is slightly inclined to the rear into an upright position, then this is detected from the load reduction on the sensors in the shoulder region of the backrest surface and by a corresponding pressure movement recorded by the sensors of the seat surface 11, and the backrest is automatically tilted forwards in order to also support the forward movement of the upper body. If the person is then still forming a hollow cross, which can also be detected by the sensors provided in the backrest surface 13, then the lumbar support 13" is correspondingly moved forwards. It can be seen that this movement pattern is only an example of the automatic adjustment of the vehicle seat 1 and that many further examples of movements can be formed, the load profile or load profile variation (load profile dynamics) of which is determined and can be stored in the memory device 40 as a reference.

In addition to the "relieving" movement patterns described above (straightening, hollow cross), "stressing" movement patterns can also cause adjustment of the seat, such as for example the quarter turn of the seat described above by the introduction of a force into the seat.

The invention is not limited to the above exemplary embodiment, which is only used for the general description of the core idea of the invention. Rather, within the scope of protection the device according to the invention can also adopt other than the embodiments described above. The device can hereby in particular comprise features representing a combination of the respective individual features of the claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adjustable vehicle seat, comprising:
a seat surface having a seat base;
a backrest having a backrest surface;
sensors provided in the seat base and/or in the backrest, wherein the sensors detect forces, pressures and/or movements exerted by a person seated on the vehicle seat and then output a signal;
actuators provided in the vehicle seat for adjusting the seat base and/or the backrest or components thereof; and
a control device configured to:
detect the signals output by the sensors,
analyze the detected signals output by the sensors and determine therefrom a current load profile of the seat base and/or the backrest,
compare the determined current load profile with load profiles which are stored in a memory and introduce a defined body movement, and determine the load profile which is closest to the current load profile and introduces a defined body movement as a predictive load profile, and
actuate the actuators such that the seat base and/or the backrest or components thereof are displaced correspondingly to the body movement associated with the predictive load profile.

2. The adjustable vehicle seat as claimed in claim 1, wherein
the control device is further configured such that, upon detecting an input variable by way of at least one of the sensors in a region of the vehicle seat, said region is displaced by at least one of the actuators in order to comply with the input variable.

3. The adjustable vehicle seat as claimed in claim 1, wherein the control device is further configured to:
analyze the detected signals output by the sensors and determines therefrom a current load profile of the seat base and/or the backrest, compare the determined current load profile with at least one standard load profile stored in a memory, and
actuate the actuators such that the determined load profile approximates to or equals the standard load profile.

4. An adjustable vehicle seat, comprising:
a seat surface having a seat base;
a backrest having a backrest surface;
sensors provided in the seat base and/or in the backrest, wherein the sensors detect forces, pressures and/or movements exerted by a person seated on the vehicle seat and then output a signal;
actuators provided in the vehicle seat for adjusting the seat base and/or the backrest or components thereof, and
a control device configured to:
detect the signals output by the sensors,
analyze the detected signals output by the sensors over a predetermined time period and determines therefrom a time-dependent current load profile dynamics of the seat base and/or the backrest,
compare the determined current load profile dynamics with load profile dynamics reproducing physiological body movement patterns and stored in a memory, and determine the load profile dynamics which are closest to current load profile dynamics and reproduce a defined physiological body movement pattern as predictive load profile dynamics, and
actuate the actuators such that the seat base and/or the backrest or components thereof are displaced time-dependently and according to the body movement pattern associated with the predictive load profile dynamics.

5. The adjustable vehicle seat as claimed in claim 4, wherein
the adjustment of the seat base and/or the backrest or of components thereof is carried out in synchronism with the physiological body movement pattern associated with the predictive load profile dynamics.

6. The adjustable vehicle seat as claimed in claim 4, wherein
the adjustment of the seat base and/or the backrest or of components thereof is carried out so as to lead or alternatively lag the physiological body movement pattern associated with the predictive load profile dynamics.

7. The adjustable vehicle seat as claimed in claim 1, wherein
a first group of said actuators are actuatable by the control device only when the vehicle is at a standstill and a second group of said actuators are actuatable by the control device while travelling and when the vehicle is at a standstill.

8. The adjustable vehicle seat as claimed in claim 7, wherein
the second group of said actuators comprises actuators that cause adjustment of at least one of the following vehicle seat components or settings:
a side panel of the seat base,
a side panel of the backrest,
a width of the seat surface,
a width of the backrest surface,
a length of the seat surface,
a thigh support, or
a lumbar support.

9. A vehicle, comprising at least one adjustable vehicle seat according to claim 1.

10. The adjustable vehicle seat as claimed in claim 4, wherein
the control device is further configured such that, upon detecting an input variable by way of at least one of the sensors in a region of the vehicle seat, said region is displaced by at least one of the actuators in order to comply with the input variable.

11. The adjustable vehicle seat as claimed in claim 4, wherein the control device is further configured to:
analyze the detected signals output by the sensors and determines therefrom a current load profile of the seat base and/or the backrest,
compare the determined current load profile with at least one standard load profile stored in a memory, and
actuate the actuators such that the determined load profile approximates to or equals the standard load profile.

12. The adjustable vehicle seat as claimed in claim 4, wherein
a first group of said actuators are actuatable by the control device only when the vehicle is at a standstill and a second group of said actuators are actuatable by the control device while travelling and when the vehicle is at a standstill.

13. The adjustable vehicle seat as claimed in claim 12, wherein
the second group of said actuators comprises actuators that cause adjustment of at least one of the following vehicle seat components or settings:
a side panel of the seat base,
a side panel of the backrest,
a width of the seat surface,
a width of the backrest surface,
a length of the seat surface,
a thigh support, or
a lumbar support.

14. A vehicle, comprising at least one adjustable vehicle seat according to claim 4.

* * * * *